T. O. BATES.
MANUFACTURE OF CUP, CORNET, AND LIKE BISCUITS.
APPLICATION FILED JUNE 20, 1910.

972,985.

Patented Oct. 18, 1910.

3 SHEETS—SHEET 1.

T. O. BATES.
MANUFACTURE OF CUP, CORNET, AND LIKE BISCUITS.
APPLICATION FILED JUNE 20, 1910.

972,985.

Patented Oct. 18, 1910.

3 SHEETS—SHEET 2.

Witnesses
E. Schallinger
E. Rehm

Inventor
Thomas Owen Bates
by B. Singer
Att'y

T. O. BATES.
MANUFACTURE OF CUP, CORNET, AND LIKE BISCUITS.
APPLICATION FILED JUNE 20, 1910.

972,985.

Patented Oct. 18, 1910.

3 SHEETS—SHEET 3.

Witnesses
C. Schallinger
C. Rehm

Inventor
Thomas Owen Bates
by B. Singer
Atty

UNITED STATES PATENT OFFICE.

THOMAS OWEN BATES, OF LIVERPOOL, ENGLAND.

MANUFACTURE OF CUP, CORNET, AND LIKE BISCUITS.

972,985.  Specification of Letters Patent.  Patented Oct. 18, 1910.

Application filed June 20, 1910. Serial No. 567,884.

*To all whom it may concern:*

Be it known that I, THOMAS OWEN BATES, a subject of the King of Great Britain, residing at Springfields, St. Anne street, Liverpool, England, have invented certain new and useful Improvements in or Connected with the Manufacture of Cup, Cornet, and Like Biscuits; and I do hereby declare the following to be a full, clear, and exact description of the invention, such as will enable others skilled in the art to which it appertains to make and use the same.

This invention has reference to machinery for the manufacture of cup, cornet, and like biscuits, and more particularly for cutting or dividing up the sheets of wafer biscuit into separate cups, cornets or like biscuits; and the chief object of the invention is to provide machinery by which this dividing or cutting up of the sheets into separate biscuits can be automatically, conveniently and economically effected.

The invention will be described in connection with the accompanying drawings, which illustrate it, and in which—

Figure 1:
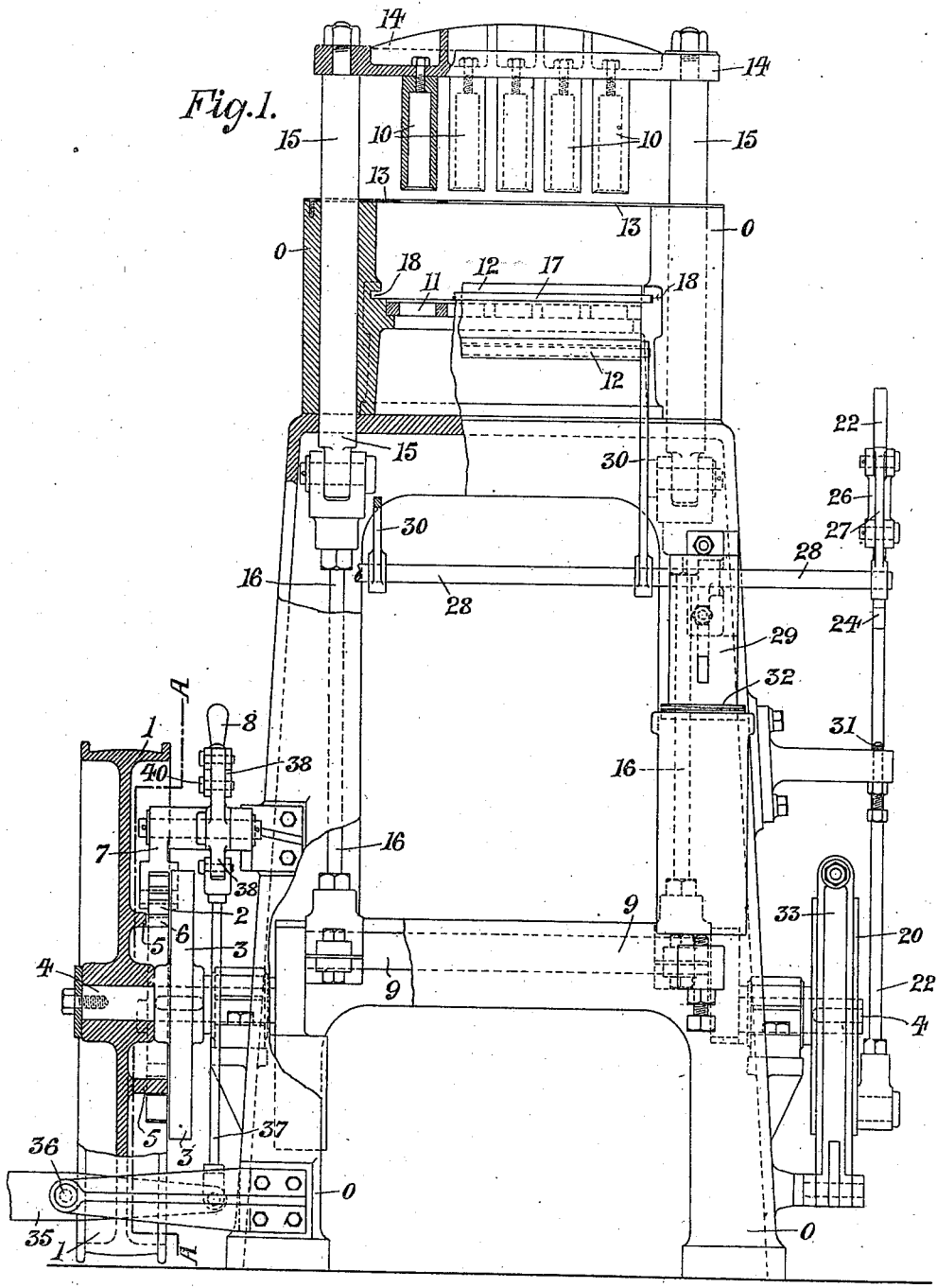
Figure 2:
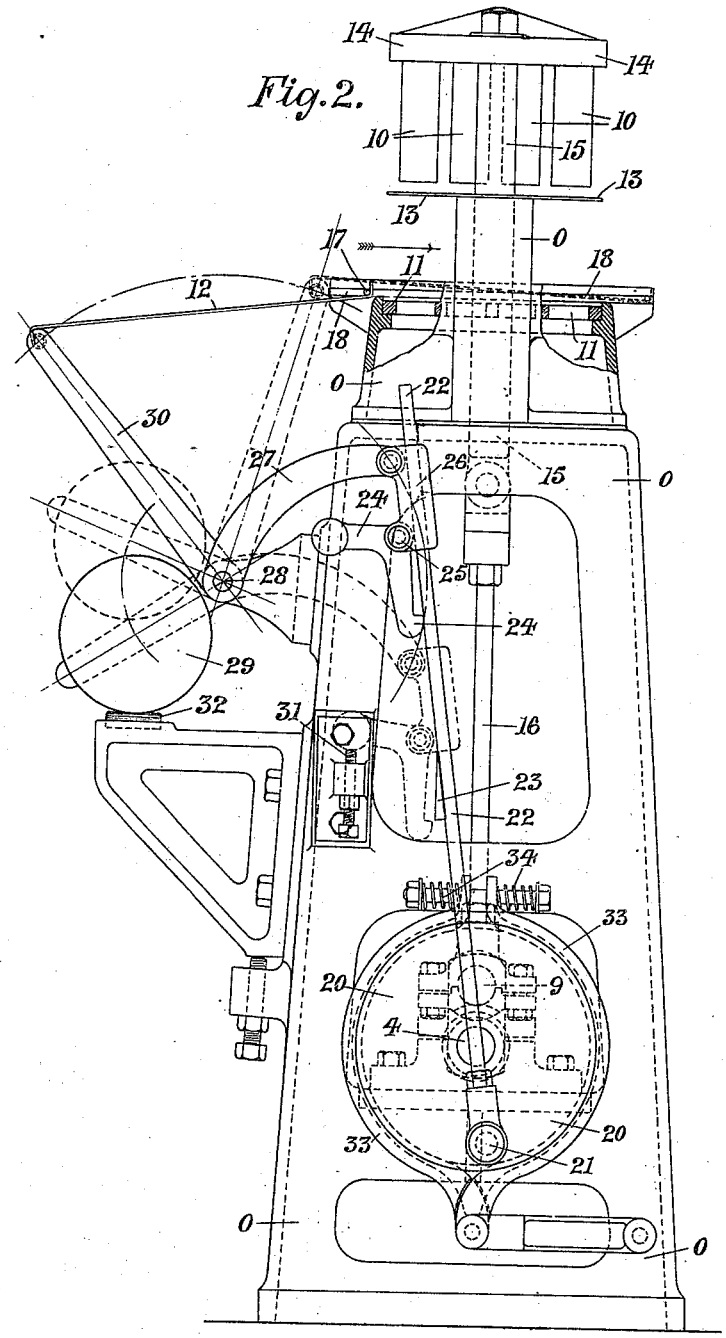
Figure 3:
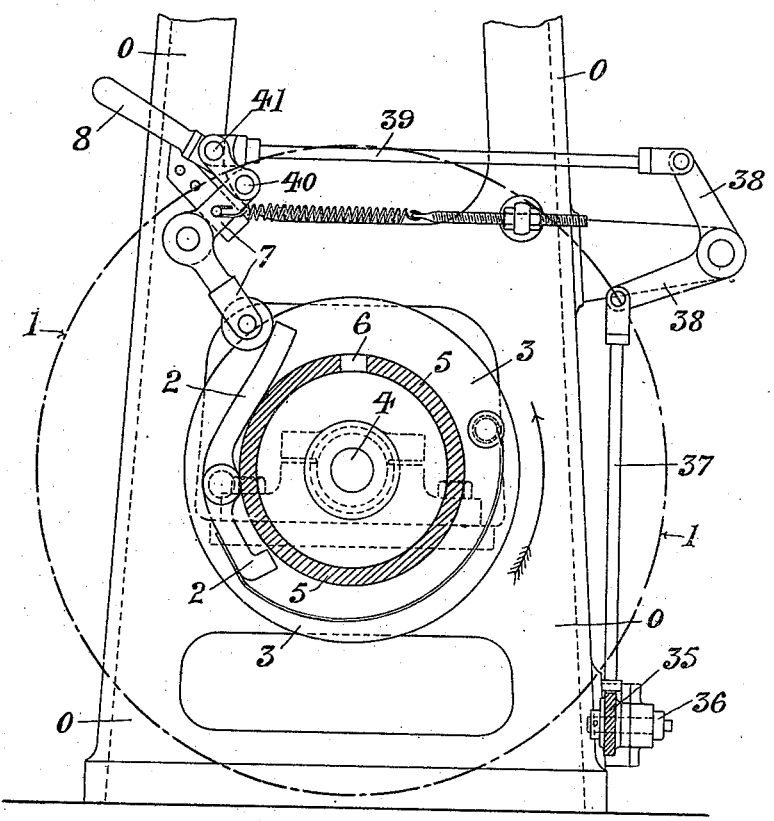

Figure 1 is a rear elevation, Fig. 2 is a side elevation, and Fig. 3 a side elevation, taken in section at the line A—A Fig. 1, a portion of the machine being shown broken away.

The machine herein described can be used mechanically in connection and combination with some kinds of known biscuit cooking machines, in which the wafer biscuits of the kind referred to are cooked; and the particular kind of machine with which it can be used in connection very advantageously, is that in which the biscuits are cooked in a plurality of "plates", with matrices in them, and these plates are moved one by one past a given point where they are undone or opened, and the cooked biscuit sheets, comprising a plurality of wafer cups, cornets, or the like, are taken out, and which can be delivered as so discharged, from the cooking machine to the machine herein illustrated. In such a case, the machine illustrated may be worked in unison with the cooking machine, and its action controlled or governed by the movement of the cooking machine in the manner hereinafter referred to; but the invention is in no way dependent upon the use of this machine in combination with the cooking machine as referred to.

The machine illustrated comprises a perforated table or plate on which the sheets of cup wafer biscuits are placed for being cut or punched; a plurality of punches working in connection with the same; a means for catching and automatically removing the debris or residue of the biscuit sheet; and means for operating these parts.

Referring now to the machine shown in the drawings, it is driven by a continuously rotating wheel 1, which is mounted loosely on a shaft 4, which constitutes a crank shaft; it being suitably supported in bearings on the main frame O.

The engagement and disengagement between the wheel and the crank shaft 4 is effected by a hinged catch or trigger 2, carried on the disk 3 by a hinge pin, the disk being fixed upon the shaft 4; and this catch or trigger operates in connection with a rim 5 on the wheel 1, which has a slot 6 in it, with which the head of the trigger 2 engages when one end of the bell crank 7—which is the hand operated part, and is manipulated by the handle 8—is moved away from the tail of the trigger; the trigger or catch being pressed into engagement with the hole 6 by a spring. After this action, the handle is let go, and is pulled back to its normal position by a spring.

When after an engagement, and the wheel 1 has revolved the disk 3 through the trigger 2, this trigger will come in contact with the roller on the bell crank lever 7, and remove it from the slot 6, and so the machine is disconnected and will stop.

The driving shaft 4 has a crank portion 9 upon it, the normal position of which is uppermost, as shown; and this crank and shaft together work all the parts of the machine.

The cutters or punches are designated 10, and they are operated from the crank shaft 9; while the biscuit sheets are operated upon, upon a perforated table or plate 11; and the residue or biscuit debris removing means consists of a tray 12, which works between the cutters or punches 10 and the table 11.

Between the table 11 and the punches 10, when at their uppermost position, there is a stripping plate 13, which has apertures in it—slightly larger than the punches or cutters 10, and is adapted to remove the remnants of the biscuit sheet adhering to the cutters or punches when they are raised in their upward movement, after the cutting or separating action.

The punches or cutters 10 are carried in a crosshead 14, mounted on slide rods 15, working and guided in the upper part of the main frame of the machine, and connected to the crank 9 by connecting rods 16. The tray 12 may be of sheet iron, having a rod 17 fixed to it at the front end, the ends of which work in guide slots 18 in the machine frame; and the front end of this tray is turned vertically upward, as shown in Fig. 2.

When a sheet of biscuit is placed on the cutting table 11, the parts will be in the position shown in the drawings, and then the handle 8 is operated as above described, and the machine starts; whereupon the cutters 10 descend, and cut or punch out the cups or cornets of the biscuit sheet which will be projecting through the apertures in the cutting plate 11; and these fall down into a receptacle, which will be below. At this time, the biscuit residue tray 12 will be out of the way at the back of the machine, as shown in Fig. 2.

After cutting, the cutters 10 rise up in the second half revolution of the crank 9, and the residue, which is carried up with them, is stripped off them by the stripper plate 13, but just before this takes place, the catch tray 12 will have been pulled under the stripper plate 13 (but after, of course, the punches have got above the level of the tray 12), whereupon the residue stripped off falls onto the tray. Then, through the motion hereinafter described, the tray 12 is given a sudden quick movement backward, and by the momentum which the biscuit pieces or residue receive in this quick motion, when the tray stops—which it does suddenly—they are thrown off, and so discharged automatically into a suitable receptacle.

The motion of the tray is effected by the crank disk 20 fixed on the shaft 4, and a crank pin 21 and rod 22 moved by it, the pin 21 being at the lowermost position when the crank 9 is in the uppermost. This is the normal relative position of these parts. Therefore, when the machine, and the crank 9 begins to go down, the crank pin 21 begins to go up, and in so doing, a catch 23 upon the rod 22 rises, and when it gets at or near the upper end of its stroke, it engages with a hinged weighted detent 24, which is mounted on a pivot 25 on a slide 26, supported through an arm 27 fixed on the shaft 28 by the counter weight 29. After this engagement—which will take place about the time the punches are beginning to rise—the pin 21 and rod 22 will descend; and through the catch 23, the sliding detent 24 and its carrier 26 will be brought down, and so will raise thereby the counter balance weight 29, and rock the shaft 28 upon its axis, and as this shaft 28 carries the outer end of the tray 12 by the arms 30, it—the tray—is moved quietly under the stripper plate 13. When the tray is in this position under the stripper plate and the pin 21 has nearly reached its lowest position, the weighted end of the hinged detent 24 comes in contact with an adjustable stop 31 fixed upon the frame O of the machine, which removes it from the catch 23, and so frees the rod 22; whereupon the weight 29 instantly and quickly falls, and so throws the tray 12—which will then have received all the debris falling from the stripper and punches—quickly backward; and when the weight 26 reaches its buffer stop 32, the momentum of the residue or debris causes them to be thrown off the tray into a receptacle. This completes the cycle of operations.

The shaft 4 and parts connected with it, and operated by it, are held in the normal position after they are released from the driven fly-wheel 1, by a brake band 33, fitted on to the rim of the disk 20, the pressure being exerted on the disk through the band by springs 34, in the well known way.

When it is desired to use the machine and work it in conjunction with a machine for making the wafer biscuit in sheets, in the case where such wafer making machine is, say, of the multiple-plate type, and these plates are moved in series, that is, revolved, say, step by step, then this machine is adapted to work in unison with that machine as hereinafter described; and as the biscuit sheets are taken off the cooking plates of the cooking machine, when its revolving cooking part is stationary, they are placed in position on the perforated carrier bar 11, and this machine will be started from some suitable part of the cooking machine, acting upon the starting mechanism described of the machine. In the drawing there is shown a lever 35, hinged at 36, having one end connected by a rod 37 with a bell crank 38, which is connected up with the hand lever 8 by a rod 39.

The hand lever 8 itself is hinged by a hinge pin 40 with the bell crank lever device 7.

To put this machine in a condition in which it will be actuated from the cooking machine, the lever 8 is thrown over upon its hinge 40, so that the connecting pin 41 of the rod 39, the pin 40, and the upper end joint of the bell crank 38, will lie in approximately the same plane in which position it will be held, so that when in this condition, the connecting parts 39 and lever 8 will be practically a solid connection, connecting the bell crank 38 with the bell crank 7; and thus the motion imparted to the bell crank 38 by the lever 35 will be transmitted to the starting bell crank lever 7, which operates in the manner above described.

To throw this machine out of action, if the starting lever 8 be thrown up in the position shown in the drawing—see Fig. 3—the lever 35 will be pulled up by this action, and out of contact with and action of the part of the cooking machine, which otherwise operates it.

I claim:—

1. In a machine for cutting or punching biscuits from a sheet of cooked biscuit material, the combination with a plurality of punches, and a perforated punching table, of a tray for receiving biscuit sheet debris, means for moving said tray into a position between said punches and said punching table, means for removing debris from said punches, and means for imparting a sudden and quick return movement to the tray and for suddenly stopping such movement whereby the momentum acquired during such movement by the debris causes it to be thrown off said tray.

2. In a machine for cutting or punching biscuits from a sheet of cooked biscuit material, the combination of a plurality of punching devices, a perforated punching table, a tray for receiving biscuit sheet debris, means for moving said tray into a position between said punching devices and said punching table, a crank shaft, means operated from said crank shaft for operating said tray-moving means and disengaging mechanism whereby a sudden and quick return movement is imparted to the tray, substantially as described.

3. In a machine for cutting or punching biscuits from a sheet of cooked biscuit material, the combination of a plurality of punches, a perforated punching table, a tray for receiving biscuit sheet debris, means for removing debris from said punches, a crank shaft, a slidable member operated from said crank shaft, means connected with said slidable member for moving said tray into a position between said punches and said punching table, and means controlled by the movement of said slidable member for imparting a sudden and quick return movement to said tray.

4. In a machine for cutting or punching biscuits from a sheet of cooked biscuit material, the combination of a plurality of punches, a perforated punching table, a tray for receiving biscuit sheet debris, means for removing debris from said punches, means for moving said tray into a position between said punches and said punching table, a weight connected with said tray-moving means and adapted to be raised when said tray is so moved, and means for permitting said weight to fall whereby a sudden and quick return movement is imparted to said tray.

5. In a machine for cutting or punching biscuits from a sheet of cooked biscuit material, the combination of a plurality of punches, a perforated punching table, a tray for receiving biscuit sheet debris, means for removing debris from said punches, a crank shaft, a rod operated from said crank shaft, a member slidable to and fro on said rod, means operated by the movement in one direction of said slidable member for moving said tray into a position between said punches and said punching table, and a weight connected to said tray-moving means and adapted to fall during the movement in the opposite direction of said slidable member whereby a sudden and quick return movement is imparted to said tray.

6. In a machine for cutting or punching biscuits from a sheet of cooked biscuit material, the combination of a plurality of punching devices, a perforated punching table, a tray for receiving biscuit sheet debris, means for removing debris from said punching devices, a crank shaft, a rod operated from said crank shaft, mechanism slidable on said rod, a lever pivoted to said tray operated from said slidable mechanism for moving said tray into a position between said punching devices and said punching table, and means controlled by the movement of said slidable member for imparting a sudden and quick return movement to the tray, substantially as described.

7. In a machine for cutting or punching biscuits from a sheet of cooked biscuit material, the combination of a plurality of punching devices, a perforated punching table, a tray for receiving biscuit sheet debris, means for removing debris from said punching devices, a crank shaft, a rod operated from said crank shaft, mechanism slidable on said rod, a lever pivoted to said tray operated from said slidable mechanism for moving said tray into a position between said punching devices and said punching table, a weight connected to said lever and adapted to be moved upwardly when said tray is so moved, means on said rod for engaging said slidable mechanism, and disengaging mechanism for releasing said last named means from its engagement with said slidable member whereby said weight is permitted to fall and a sudden and quick return movement is imparted to said tray.

8. In a machine for cutting or punching biscuits from a sheet of cooked biscuit material, the combination of a plurality of punching devices, a perforated punching table arranged beneath said punching devices, a tray for receiving biscuit sheet debris, means for removing debris from said punching devices, a crank shaft, a rod operated from said crank shaft, mechanism slidable on said rod, means operated from said slidable mechanism for moving said tray into a position between said punching devices and said punching table, means on said rod for engaging said slidable mechanism, disengaging mechanism for releasing said last named means from its engagement with said slidable mechanism, and means for imparting a sudden and quick return movement to the tray and for suddenly stopping such movement, substantially as described.

9. In a machine for cutting or punching biscuits from a sheet of cooked biscuit material, the combination of a plurality of punching devices, a perforated punching table arranged beneath said punching devices, a tray for receiving biscuit sheet debris, means for removing debris from said punching devices, a crank shaft, a rod operated from said crank shaft, a member slidable on said rod, a hook catch pivoted on said slidable member, means connected with said slidable member for moving said tray into a position between said punching devices and said punching table, means on said rod for engaging said hook catch, disengaging mechanism for releasing said last named means from its engagement with said hook catch, and means controlled by the movement of said slidable member for imparting a sudden and quick return movement to the tray and for suddenly stopping such movement, substantially as described.

10. A machine comprising in combination a continuously revolving driving wheel; a crank shaft, adapted to be driven thereby; an engaging and disengaging manually-operated mechanism, for putting in action and stopping the crank shaft; a head carrying a plurality of punches operated from said crank at each side by connecting rods and slides; a perforated punching table, a biscuit sheet debris removing tray operated from the said crank shaft, and disposed and adapted to move in between the punches and the punching table; and means for operating said tray consisting of a trigger, having a weight connected with it by which said tray is actuated when the trigger is released.

11. In a machine for cutting or punching biscuits from a sheet of cooked biscuit material, a movable tray for removing the residue or debris of the biscuit sheet, and means for operating such tray, comprising a rotating disk, a connecting rod eccentrically connected thereto, and having a projecting catch; a sleeve in which the connecting rod slides, a weighted hook catch pivotally mounted on the sleeve, and having an end portion capable of being engaged by the catch on the rod; a weighted lever connected to the sleeve a pin on which said lever is pivotally mounted; and a connecting rod connecting the movable debris tray with the pin and weighted lever.

In testimony whereof, I affix my signature, in presence of two witnesses.

THOMAS OWEN BATES.

Witnesses:
S. J. EARL,
H. D. JAMESON.